United States Patent
Nguyen et al.

(10) Patent No.: US 11,037,060 B2
(45) Date of Patent: Jun. 15, 2021

(54) ANALYZING SEQUENCE DATA USING NEURAL NETWORKS

(71) Applicant: Arimo, LLC, Mountain View, CA (US)

(72) Inventors: Christopher T. Nguyen, Los Altos, CA (US); Nhan Vu Lam Chi, Ho Chi Minh (VN); Binh Han, Mountain View, CA (US); Anh H. Trinh, Mountain View, CA (US); Mohammad Saffar, Mountain View, CA (US)

(73) Assignee: Arimo, LLC, Mountain View, CA (US)

(*) Notice: Subject to any disclaimer, the term of this patent is extended or adjusted under 35 U.S.C. 154(b) by 601 days.

(21) Appl. No.: 15/971,267

(22) Filed: May 4, 2018

(65) Prior Publication Data

US 2018/0322394 A1    Nov. 8, 2018

Related U.S. Application Data

(60) Provisional application No. 62/502,595, filed on May 5, 2017.

(51) Int. Cl.
*G06N 3/08*    (2006.01)
*G06N 3/04*    (2006.01)
(Continued)

(52) U.S. Cl.
CPC ............. *G06N 3/088* (2013.01); *G06F 15/76* (2013.01); *G06K 9/4628* (2013.01);
(Continued)

(58) Field of Classification Search
CPC ........ G06N 3/04; G06N 3/088; G06N 3/0454; G06N 3/0445; G06N 3/08; G06N 20/00;
(Continued)

(56) References Cited

U.S. PATENT DOCUMENTS

2013/0223724 A1*   8/2013   Wersborg ............. B23K 26/322
                                                            382/152
2014/0201126 A1    7/2014   Zadeh et al.
(Continued)

FOREIGN PATENT DOCUMENTS

WO     WO 2017/034512 A1    3/2017

OTHER PUBLICATIONS

PCT International Search Report and Written Opinion, PCT Application No. PCT/US18/31081, dated Jul. 19, 2018, 13 pages.
(Continued)

*Primary Examiner* — Robert G Bachner
(74) *Attorney, Agent, or Firm* — Fenwick & West LLP

(57) ABSTRACT

Sequence data, such as time series data is analyzed using neural networks, for example, recurrent neural networks. The sequence data is obtained from a source. For example, a sequence data may represent time series data obtained from a sensor. As another example, the sequence of data may represent a sequence of user interactions performed by a user with an online system. The sequences of data are provided as input to a neural network. A feature vector representation of each input sequence data is extracted from the neural network. The feature vector representation is used for clustering the sequence data. Salient features of clusters of sequence data are determined. The salient features of clusters of sequence data are provided for display via a user interface.

18 Claims, 7 Drawing Sheets

(51) Int. Cl.
G06K 9/62 (2006.01)
G06N 20/00 (2019.01)
G06K 9/46 (2006.01)
G06F 15/76 (2006.01)

(52) U.S. Cl.
CPC ......... *G06K 9/6215* (2013.01); *G06K 9/6218* (2013.01); *G06K 9/6271* (2013.01); *G06N 3/04* (2013.01); *G06N 3/0445* (2013.01); *G06N 3/0454* (2013.01); *G06N 3/08* (2013.01); *G06N 20/00* (2019.01)

(58) Field of Classification Search
CPC .. G06K 9/6218; G06K 9/6215; G06K 9/6271; G06K 9/4628; G06F 15/76
See application file for complete search history.

(56) References Cited

U.S. PATENT DOCUMENTS

2016/0078369 A1 3/2016 Frank et al.
2016/0155136 A1 6/2016 Zhang et al.

OTHER PUBLICATIONS

Bell, S. et al., "Learning Visual Similarity for Product Design with Convolutional Neural Networks," ACM Transactions on Graphics, Aug. 2015, vol. 34, No. 4, Article 98, 10 pages.
Kiela, D. et al., "Learning Image Embeddings Using Convolutional Neural Networks for Improved Multi-Modal Semantics," Proceedings of the 2014 Conference on Empirical Methods in Natural Language Processing (EMNLP), 2014, pp. 36-45.
Li, Y. et al., "Joint Embeddings of Shapes and Images Via CNN Image Purification," ACM Transactions on Graphics (TOG), Nov. 2015, 12 pages, vol. 34, Issue 6, Article No. 234.
Rousseeuw, P.J., "Silhouettes: A Graphical Aid to the Interpretation and Validation of Cluster Analysis," Journal of Computational and Applied Mathematics, 1987, pp. 53-65, vol. 20.
Wang, J. et al., "Learning Fine-Grained Image Similarity with Deep Ranking," 2014 IEEE Conference on Computer Vision and Pattern Recognition, 2014, pp. 1386-1393.
"Dynamic Time Warping," Wikipedia.org, Last Edited Jul. 5, 2018, 6 pages, [Online] [Retrieved on Jul. 10, 2018] Retrieved from the Internet<URL:https://en.wikipedia.org/wiki/Dynamic_time_warping>.
Cherif, A. et al., "Recurrent Neural Networks as Local Models for Time Series Prediction," ICONIP 2009, Dec. 1, 2009, pp. 786-793.
European Patent Office, Extended European Search Report and Opinion, EP Patent Application No. 18795244.5, dated Feb. 11, 2021, nine pages.

* cited by examiner

ANALYZING SEQUENCE DATA USING NEURAL NETWORKS

CROSS REFERENCE TO RELATED APPLICATIONS

This application claims the benefits of U.S. Provisional Application No. 62/502,595 filed on May 5, 2017, which is incorporated by reference in its entirety.

BACKGROUND

The disclosure relates in general to processing of time series, for example, sensor data and more specifically to extraction of salient features of time series data based on recurrent neural networks.

Various systems process sequences of data, for example, time series data collected from sensors or time series data representing user interactions with an online system. Systems may analyze such data for various reasons, for example, a system may analyze sequences of sensor data to analyze characteristics of the corresponding sensors. Processing such sequences of data is often challenging for various reasons. For example, different sequences may have different number of elements that appear at different points in time. For example, a particular sensor may report data at different time intervals that keep changing. Furthermore, the rate at which the sensor reports data may be very different from rate at which another sensor may report data. Furthermore, the amount of data being processed can be very large. A system may receive data from several thousand sensors and each sensor may report data multiple times a second. As a result, the amount of data being processed by the system can be large and processing the data can be a very computationally intensive process.

Conventional techniques for analyzing sequence data often aggregate the sequence data and then analyze it. Furthermore, features used for analyzing the data are selected by users. For example, a user may represent the sequence using statistics such as mean and standard deviation of the data values. However, there may be other characteristics of the sequence data that may be significant that a user fails to select. For example, a significant feature of a sequence may be a presence of a subsequence having a particular characteristic. A user may not identify such features that are not very intuitive. Significant information available in the sequences is lost as a result of aggregation and arbitrary selection of features for analysis. Furthermore, a user may identify and process features that are not relevant for certain type of analysis, thereby making the process inefficient by producing irrelevant intermediate results. As a result, conventional techniques often produce inadequate results based on analysis of sequence data and are computationally inefficient.

SUMMARY

A computer system analyzes sequences of data. The system receives a plurality of sequences of data. Each sequence of data may be of a different length. The system provides each sequence of data as input to a recurrent neural network. The recurrent neural network comprises one or more hidden layers. The system extracts a feature vector representing output of a hidden layer of the recurrent neural network. The feature vector acts as a representation of the input sequence of data. The system clusters the extracted feature vectors to determine a plurality of clusters of feature vectors. The system determines one or more salient features characterizing each cluster. The system sends information describing the clusters to a client device for presentation via a user interface.

In an embodiment, the system determines salient features for a cluster as follows. The system receives a set of features. For each feature from the set of features, the system determines a feature score. The feature score is determined based on a comparison of a measure of similarity of the feature within the cluster with a measure of similarity of the feature in a second cluster or group of sequences of data. The second group of sequences of data may be substantially the same as the plurality of sequences of data that were received or obtained by sampling the plurality of sequences of data received. The system identifies one or more features from the set of features as salient features based on the feature scores.

In an embodiment, the recurrent neural network is an autoencoder configured to receive an input sequence and generate an output sequence matching the input sequence.

In another embodiment, a computer system analyzes sequences of data received from devices, for example, time series data. The system receives a plurality of sequences of data. An example of a sequence of data is time series data received from sensors. Another example of a sequence of data is a time series representing user interactions performed by a user, for example, with an online system. The system determines groups of sequences of data. The system determines salient features for each group of sequences of data as follows. The system receives a set of features. For each feature from the set of features, the system determines a feature score. The system determines the feature score based on a comparison of a measure of similarity of the feature within the cluster with a measure of similarity of the feature in a second group of sequences of data. The second group of sequences of data may be obtained by sampling the plurality of sequences of data received. The system identifies one or more features from the set of features as salient features based on the feature scores. For example, the system may identify a feature of a group of sequences of data as a salient feature if the measure of similarity of the feature within the group is determined to be higher than the measure of similarity of the feature in the second group of sequences of data by a threshold value. The system sends information describing groups of sequences of data to a client device for presentation via a user interface.

In an embodiment, the system determines the plurality of groups of sequences of data by processing each sequence of data using a recurrent neural network to obtain a feature vector and clustering the feature vectors. In an embodiment, the recurrent neural network is an autoencoder configured to receive an input sequence of data and generate an output sequence of data matching the input sequence

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Figure 1:
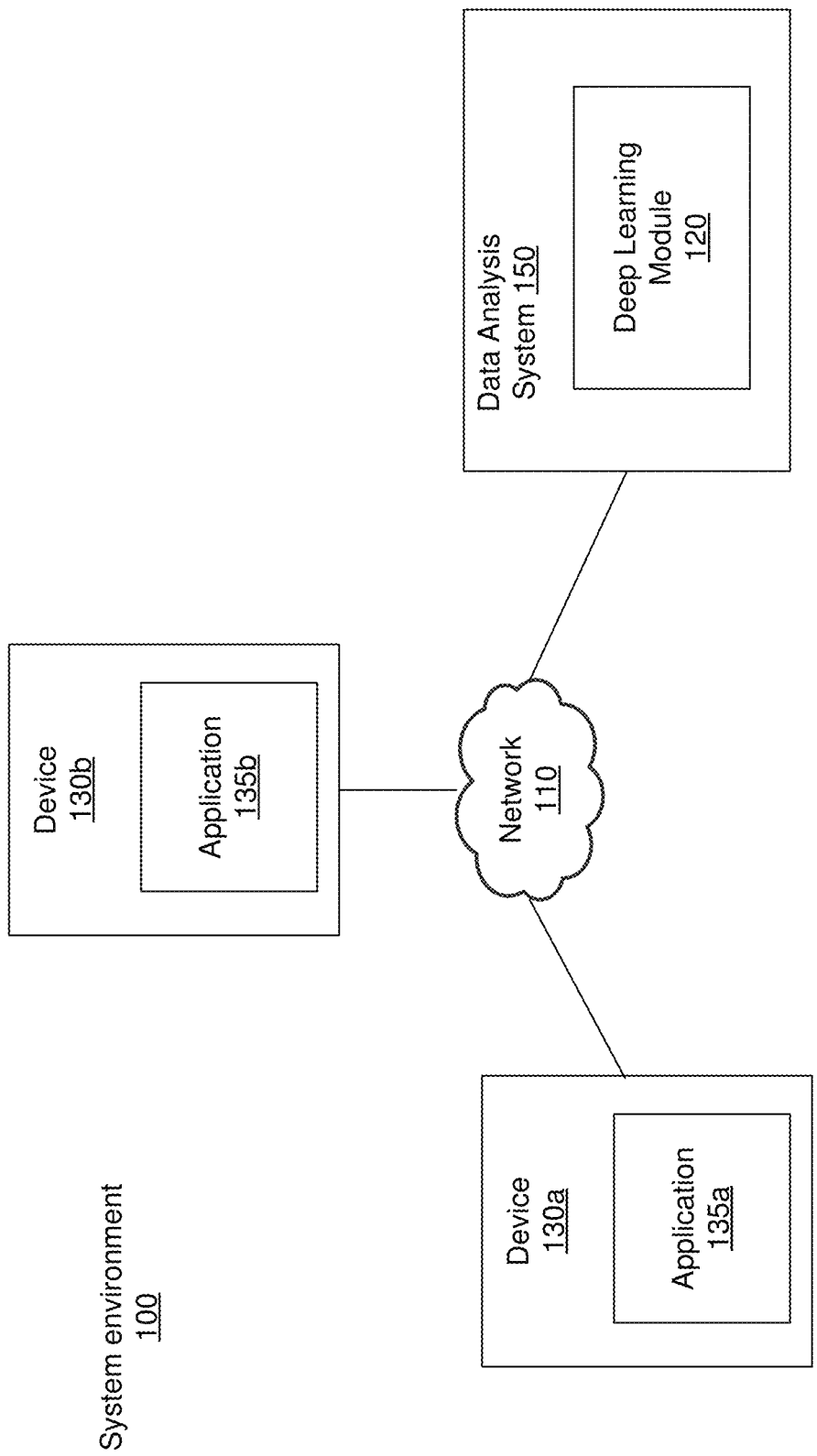
FIG. 1 shows the overall system environment for extracting salient features associated with sequences, in accordance with an embodiment of the invention.

FIG. 1 shows the overall system environment for extracting salient features associated with sequences, in accordance with an embodiment of the invention. The overall system environment includes one or more devices 130, a data analysis system 150, and a network 150. Other embodiments can use more or less or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130" and/or "130" in the figures).

Figure 3:
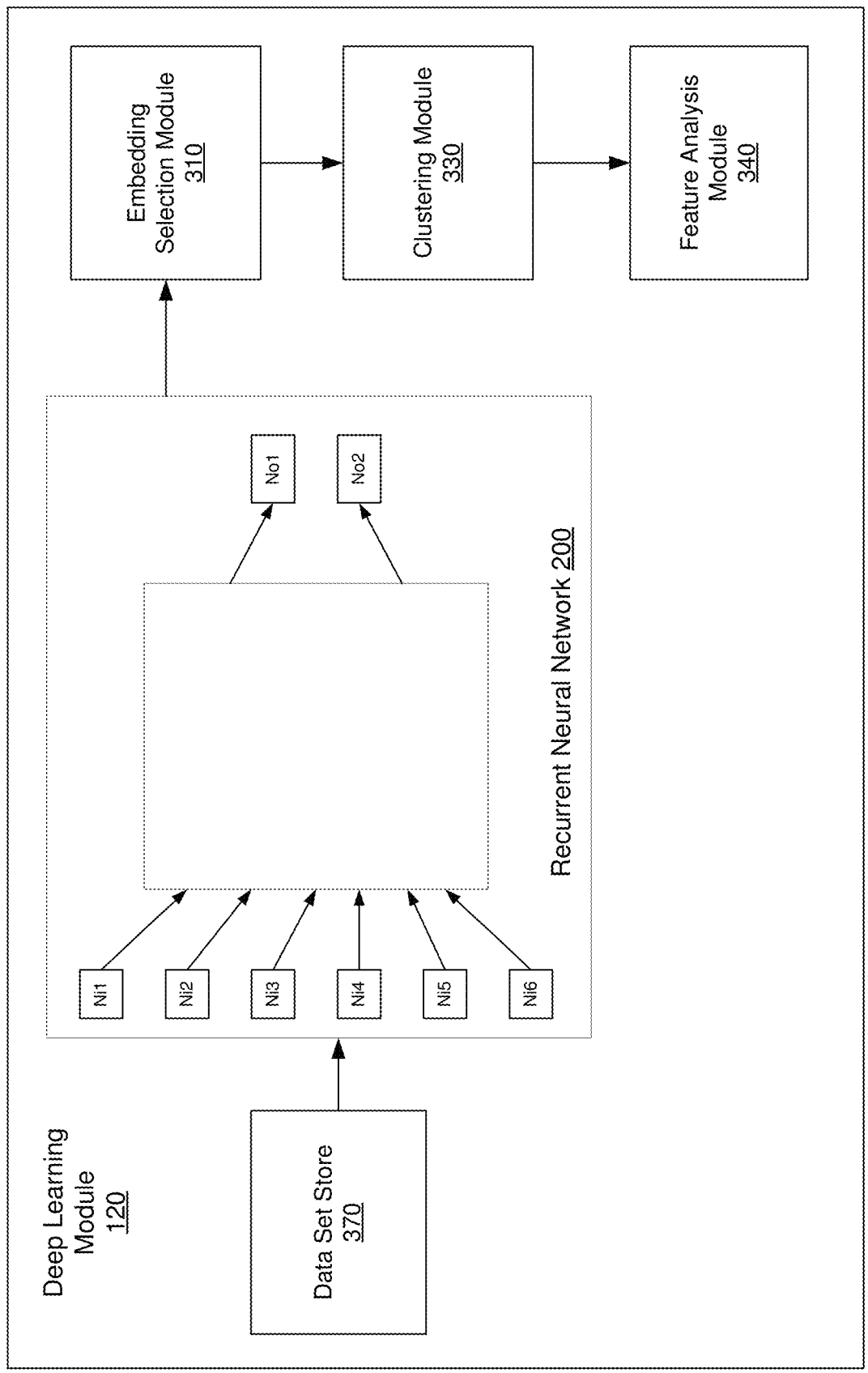
FIG. 3 shows the system architecture of a deep learning module for training and execution of neural networks, in accordance with an embodiment.

The data analysis system 150 includes a deep learning module 120 that performs training of neural networks and also allows users to execute the neural network for data being processed. The data analysis system 150 receives sequences of data, for example, time series data and performs analysis of the received data. Further details of the deep learning module 120 are illustrated in FIG. 3 and described in connection with FIG. 3

In an embodiment, the devices 130 provide sequences of data or time series data that is analyzed by the data analysis system 150. For example, users may interact with an online system using the devices 130. The user interactions act as time series data or sequences of data that are provided to the data analysis system 150 for analysis. The data analysis system 150 may analyze the user interaction data to predict behavior or characteristics of users that performed the user interactions. The result of the analysis may be reported via a user interface. In some embodiments, the result of the analysis may be used to determine how to distribute content to users. For example, users may be provided with content that is likely to be of interest to them based on their characteristics. As another example, the timing of distribution of content to users may be determined based on characteristics of the users. For example, certain users may be provided with certain type of content at a particular time of day, day of week, or a particular time of the year based on their observed behaviors.

In some embodiments, the devices 130 may execute code that provides time series data based on events that occur in the code. The devices 130 may provide click stream data to the data analysis system 150 for analysis. The data analysis system 150 may receive time series data representing events that occur in various systems that may be devices or servers. The data analysis 150 system may determine characteristics of the servers/clients sending the data and may take actions based on the analysis. For example, the data analysis 150 may send an alert in response to certain observed characteristics of time series data received from one of more servers. Alternatively, the data analysis 150 may take a suitable action in response to the analysis, for example, by shutting down a server, reducing load of a server by redirecting requests received by the server to another server, starting or stopping certain processes on the server, or performing other resource management related tasks based on the analysis. In another embodiment, the sequence data represents time series data received from sensors as further described herein.

A device can be any physical device, for example, a device connected to other devices or systems via Internet of things (IoT). The IoT represents a network of physical devices, vehicles, home appliances and other items embedded with electronics, software, sensors, actuators, and connectivity which enables these objects to connect and exchange data. A device can be a sensor that sends sequence of data sensed over time. The sequence of data received from a device may represent data that was generated by the device, for example, sensor data or data that is obtained by further processing of the data generated by the device. Further processing of data generated by a device may include scaling the data, applying a function to the data, or determining a moving aggregate value based on a plurality of values generated by the device, for example, a moving average.

The data analysis system 150 may receive data from other systems that perform data collection. For example, an external system may invoke a data load utility of the data analysis system 150 to provide data stored by the external system to the data analysis system 150.

In an embodiment, the devices 130 are client devices used by users to interact with the computer system 150. The users of the devices 130 include experts that perform labeling of data points, system administrators that perform various administrative tasks associated with the neural networks or other software executing on data analysis system 150. In an embodiment, the device 130 executes an application 135 that allows users to interact with the data analysis system 150. For example, the application 135 executing on the device 130 may be an internet browser that interacts with web servers executing on data analysis system 150.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the devices 130 and the data analysis system 150 are typically performed via a network 150, for example, via the internet. The interactions between the data analysis system 150 and the computer systems 120 of the enterprise 110 are also typically performed via a network 150. In one embodiment, the network uses standard communications technologies and/or protocols. In another embodiment, the various entities interacting with each other, for example, the computer systems 150 and the devices 130 can use custom and/or dedicated data communications technologies instead of, or in addition to, the ones described above. Depending upon the embodiment, the network can also include links to other networks such as the Internet.

Figure 2:
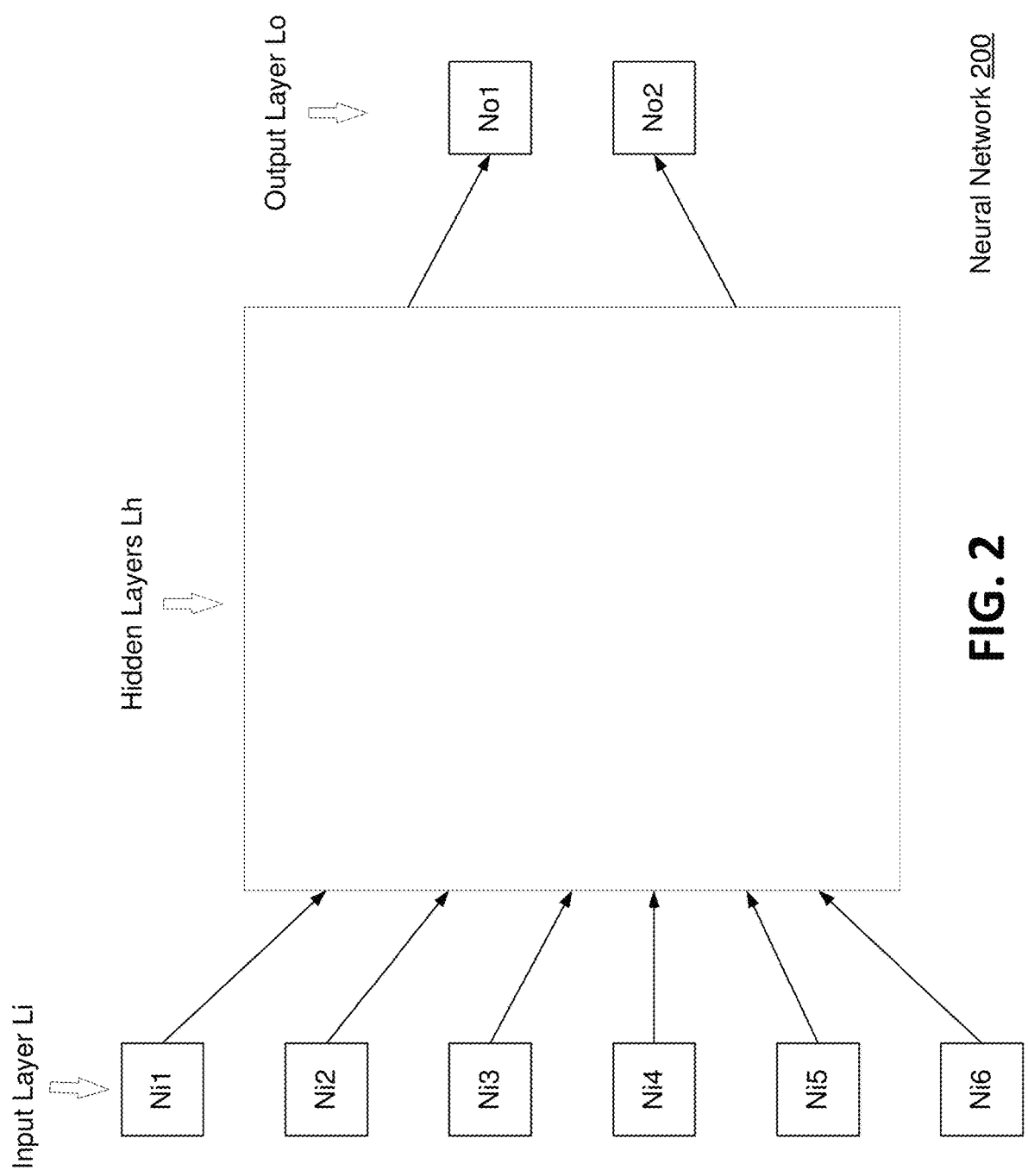
FIG. 2 shows an example recurrent neural network, in accordance with an embodiment.

The data analysis system 150 includes a deep learning module 120 that comprises a neural network for processing the sequences of data. FIG. 2 shows an example neural network, in accordance with an embodiment. In the neural network 200 or any artificial neural networks, nodes are connected together to form a network. The nodes may be grouped together in various hierarchy levels. The nodes may represent input, intermediate, and output data. A node characteristic may represent data such as a pixel and other data processed using the neural network. The node characteristics values may be any values or parameters associated with a node of the neural network. Each node has an input and an output. Each node of the neural network is associated with a set of instructions corresponding to the computation performed by the node. The set of instructions corresponding to the nodes of the neural network may be executed by one or more computer processors. The neural network 200 may also be referred to as a deep neural network.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

As shown in FIG. 2, the neural network 200 comprises multiple layers. These include an input layer Li, and output layer Lo and one or more hidden layers Lh. Each layer has one or more nodes. For example, layer Li has nodes Ni1, Ni2, Ni3, Ni4, Ni5, and Ni6 and layer L0 has nodes No1 and No2.

The nodes may be organized as input nodes, hidden nodes, and output nodes. Accordingly nodes of the input layer are input nodes, nodes of the output layer are output nodes, and nodes of the hidden layers are hidden nodes. Nodes of a layer may provide input to another layer and may receive input from another layer. In an embodiment, the neural network is a recurrent neural network as further described herein.

System Architecture

FIG. 3 shows the system architecture of a deep learning module for training and execution of neural networks, in accordance with an embodiment. The deep learning module 120 comprises a data set store 370, the neural network 200, an embedding selection module 310, a clustering module 320, and a feature analysis module 340. In other embodiments, the deep learning module 120 may include more of fewer modules than those shown in FIG. 2. Furthermore, specific functionality may be implemented by modules other than those described herein. In some embodiments, various components illustrated in FIG. 3 may be executed by different computer systems 150. For example, the neural network 200 may be executed by one or more processors different from the processors that execute the clustering module 320 or the labelling module 350. Furthermore, the neural network 200 may be executed using a parallel or distributed architecture for faster execution.

The data set store 370 receives and stores data sets representing sequences of data (or time series). Different data sets may represent sequences of data of different length, i.e., each sequence may have different number of elements. In an embodiment, each data set is associated with a sensor and represents sensor data provided by that sensor. For example, a sensor may monitor certain information such as temperature, pressure, or occurrence of any event and report the information to a system that stores the incoming data as time series associated with the sensor.

As another example, each data set may represent any machine behavior, for example, events that occur in a server that are reported by the server. Accordingly each data set is associated with a server (or machine) and comprises a sequence of timed events reported by the server (or machine). Examples of events reported may include specific function calls executed by the server, cache hits, cache misses, interrupts, or other events that may occur on a server or machine.

As another example, each data set represents user interactions associated with a user (or users). The user interactions may be performed by a user via a client device with an online system. Each data set may represent t user interactions performed during a user session, wherein the session is started using a connection initiated by a client device to perform interactions with an online system and ends when the connection is closed. As another example, user interactions may represent calls made by users, for example, customer service calls made by users that are monitored and stored as a time series. In these embodiments, each user interaction performed by the user is stored as an element of a time series and is associated with a time stamp, i.e., the timestamp associated with the time that the call was made or the user interaction performed.

In another embodiment, each data set is associated with a stock and the time series represents stock values at different points in time. Even though embodiments describe analysis of time series data, the techniques described herein apply to any sequence data comprising data values having certain order.

The neural network 200 is as described in FIG. 2. In an embodiment, the neural network 200 is a recurrent neural network (RNN) such that one or more nodes are connected to form a directed cycle or a loop. An example RNN includes a layer Lm that occurs before layer Ln when tracking the layers from the input layer to the output layer. Accordingly, layer Lm is closer to the input layer compared to layer Ln and the output of layer Lm is provided as input to layer Ln, possibly via one or more other layers. The RNN is configured to provide as feedback, the output of a layer Ln as input to the layer Lm (possibly via other layers). Accordingly, the layer Lm receives input from previous layers of the RNN as well as the output of layer Ln. The feedback loops of an RNN allow the RNN to store state information.

As another example, the recurrent neural network may include a layer Lq such that the output of Lq is provided as input to the layer Lq. The directed cycles allow the recurrent neural network to store state information thereby acting as internal memory for the recurrent neural network. In an embodiment, the neural network 200 is a long short term memory (LSTM) neural network. The neural network 200 may also be referred to as recurrent deep neural network.

In an embodiment, the neural network 200 is an autoencoder that takes an input, encodes the input, and regenerates an output that matches the input. For example, the autoencoder may be configured to receive a sequence as input, encode the sequence to a feature vector representation, and regenerate the input sequence as the output. The feature vector representation of the input sequence is a compressed version of the input sequence. In an embodiment, the feature vector representation has a fixed number of dimensions (or elements), independent of the size of the input sequence. The feature vector representation allows efficient comparison of two sequences that may have different number of elements since the feature vector representations of both sequences has the same number of elements. Accordingly, embodiments use distance metrics such as Euclidian distance metrics to compare the feature vector representations of the sequences. Furthermore, the clustering module 330 can use clustering techniques such as k-means to cluster the feature vector representations based on the distance metrics. The feature vector representation of a sequence is also referred to herein as an embedding of the sequence. The features represented in the feature vector used for clustering are also referred to as clustering features.

Predicted output of the autoencoder may not be identical to the input but may be a close approximation of the input. Accordingly, the autoencoder receives an input X and generates an output that predicts the input X. In the process, the autoencoder generates a feature vector representation of the input based on reduced dimensions.

During each iteration of training, the neural network 200 generates embeddings representing the sample input data at various layers. An embedding is a feature vector representation of the input data set. The feature vector representation has the same number of elements for different input data sets even if the time series (or sequence of data) corresponding to the input data sets are of different sizes.

The embedding selection module 310 extracts feature vector representations of input data sets from a hidden layer of the neural network 200. In an embodiment, embedding selection module 310 extracts the feature vector representation of the input data sets from the last hidden layer of the neural network 200 that provides input to the output layer of the neural network 200. The embedding selection module 310 provides the extracted feature vector representations as input to the clustering module 320.

The clustering module 320 receives a set of feature vector representations from the embedding selection module 310. Each feature vector represents a data set that was provided as input during a particular iteration to the neural network 200. The clustering module 320 performs clustering of the received set of feature vectors and generates a set of clusters. A cluster comprises one or more feature vectors. Each feature vector represents an input data set. Accordingly, each cluster comprises one or more data sets. A data set may be associated with an entity, for example, a data set comprising a sequence of user interactions is associated with a user (or user account), a data set comprising a time series representing data provided by a sensor is associated with the sensor. Accordingly, each cluster can be considered a cluster of the entities corresponding to the data sets assigned to the cluster.

The clustering module 320 uses a distance metric that represents a distance between any two feature vectors and identifies clusters of feature vectors that represent feature vectors that are close to each other according to the distance metric. For example, a distance between two feature vectors may be computed using as Euclidean distance metric. The clustering module 320 may use a clustering techniques, for example, k-means clustering, distribution-based clustering, hierarchical clustering, and so on.

The feature analysis module 340 identifies salient features of each of a set of clusters. The salient features of a cluster represent features that characterize that particular cluster. Accordingly, data sets that have a particular salient features are more likely to have matching values of the salient feature as compared to other data sets, for example, the entire population of data sets or a sample of the entire population of the data sets. Similarly, entities that have a particular salient features are more likely to have matching values of the salient feature as compared to other entities, for example, the entire population of entities or a sample of the entire population of entities. The process executed by the feature analysis module 340 for identifying salient features is further described herein.

Overall Process

Figure 4:
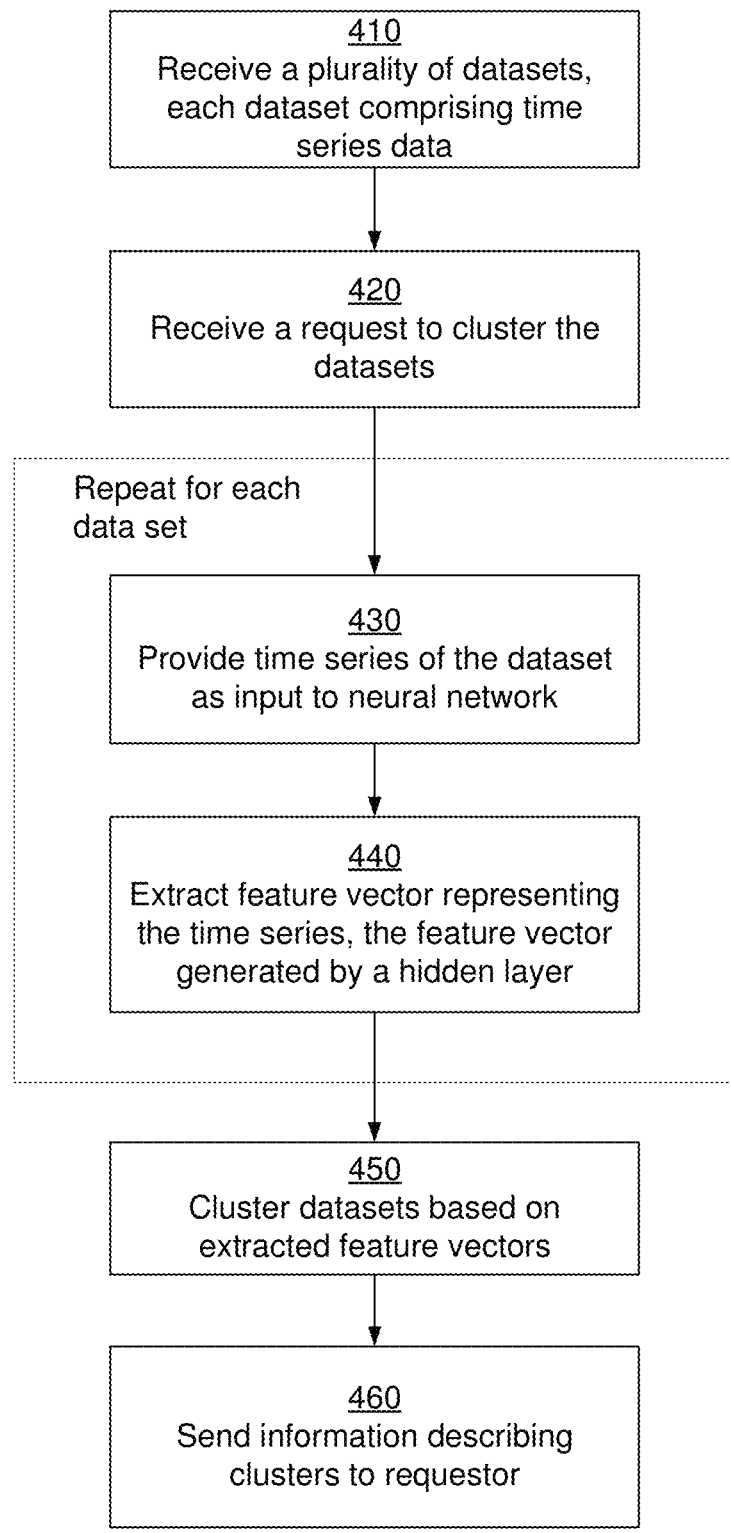
FIG. 4 illustrates the overall process for clustering time series data, according to an embodiment of the invention.

FIG. 4 illustrates the overall process for clustering time series data, according to an embodiment of the invention. The steps illustrated in the process may be performed in an order different from that indicated in FIG. 4. Furthermore, the steps may be executed by modules different from those indicated herein. Although the following description illustrates the process using time series data, the process described in FIG. 4 is applicable to any sequence data comprising an ordered list of data values.

The data analysis system 150 receives 410 a plurality of data sets and stores them in the data set store 370. Each data set comprises a sequence of data values, for example, a time series. A time series is a sequence of data values, wherein each data value associated with a time value. The time value may be represented as a time stamp. The time value may represent the time that the data value was generated or the time that the data value was received by a system. For example, an online system receiving user interactions may log each user interaction along with a timestamp associated with the user interaction. Accordingly data stored in the logs of the online system comprises one or more time series.

Other examples of time series data include sensor data and user interaction data. Each data set (or sequence of data or time series) may be associated with an entity, for example, an entity that is a source of the data set. For example, each data set comprising a time series representing sensor data is associated with a sensor that provided the data. Similarly, each data set comprising a time series representing user interactions is associated with a user or a user account of a user that performed the user interactions.

The data analysis system 150 receives 420 a request to cluster the plurality of data sets received. A cluster of data sets corresponds to a cluster of the entities associated with the data sets. For example, if data sets represent user interactions, the cluster of data sets corresponds to clusters of users associated with the data sets. Similarly, if data sets represent sensor data, the cluster of data sets correspond to clusters of sensors associated with the data sets.

The data analysis system 150 repeats the following steps 430 and 440 for each data set. The data analysis system 150 provides the data set as input to the neural network 200. The neural network 200 receives the data values of the sequence represented by the data set and processed them. In an embodiment, a sequence of data values of the data set is provided as input to the neural network 200 one data value at a time in the order of the sequence. For example, the first element of the sequence is processed by the first layer (input layer) of the neural network. When the second element of the sequence is provided as input to the first layer, the data corresponding to the first element is being processed by the second layer of the neural network.

The embedding selection module 310 extracts 440 a feature vector representing the input data set. The embedding selection module 310 extracts 440 the output generated by a hidden layer as the feature vector representation of the input data set. In an embodiment, the embedding selection module 310 extracts 440 the output generated by the last hidden layer, i.e., the output generated by the last hidden layer that is provided as input to the output layer.

The clustering module 330 clusters 450 the feature vectors extracted by the embedding selection module 310. In an embodiment, the clustering module 330 clusters 450 the feature vectors using a distance metric, for example, Euclidean distance between feature vectors. In an embodiment, the clustering module 330 clusters 450 the feature vectors using k-means clustering technique. In an embodiment, the data analysis system 150 determines a cluster of input data sets corresponding to the clusters of feature vectors. Alternatively, the data analysis system 150 may determine clusters of entities associated with each cluster of feature vectors. For example, if the input data sets represent sequences of user interactions, the data analysis system 150 determines cluster of users wherein each user is associated with one or more data sets representing a sequence of user interactions. As another example, if the input data sets represent time series data received from sensors, the data analysis system 150 determines cluster of sensors wherein each sensor is associated with one or more input data sets.

Figure 5:
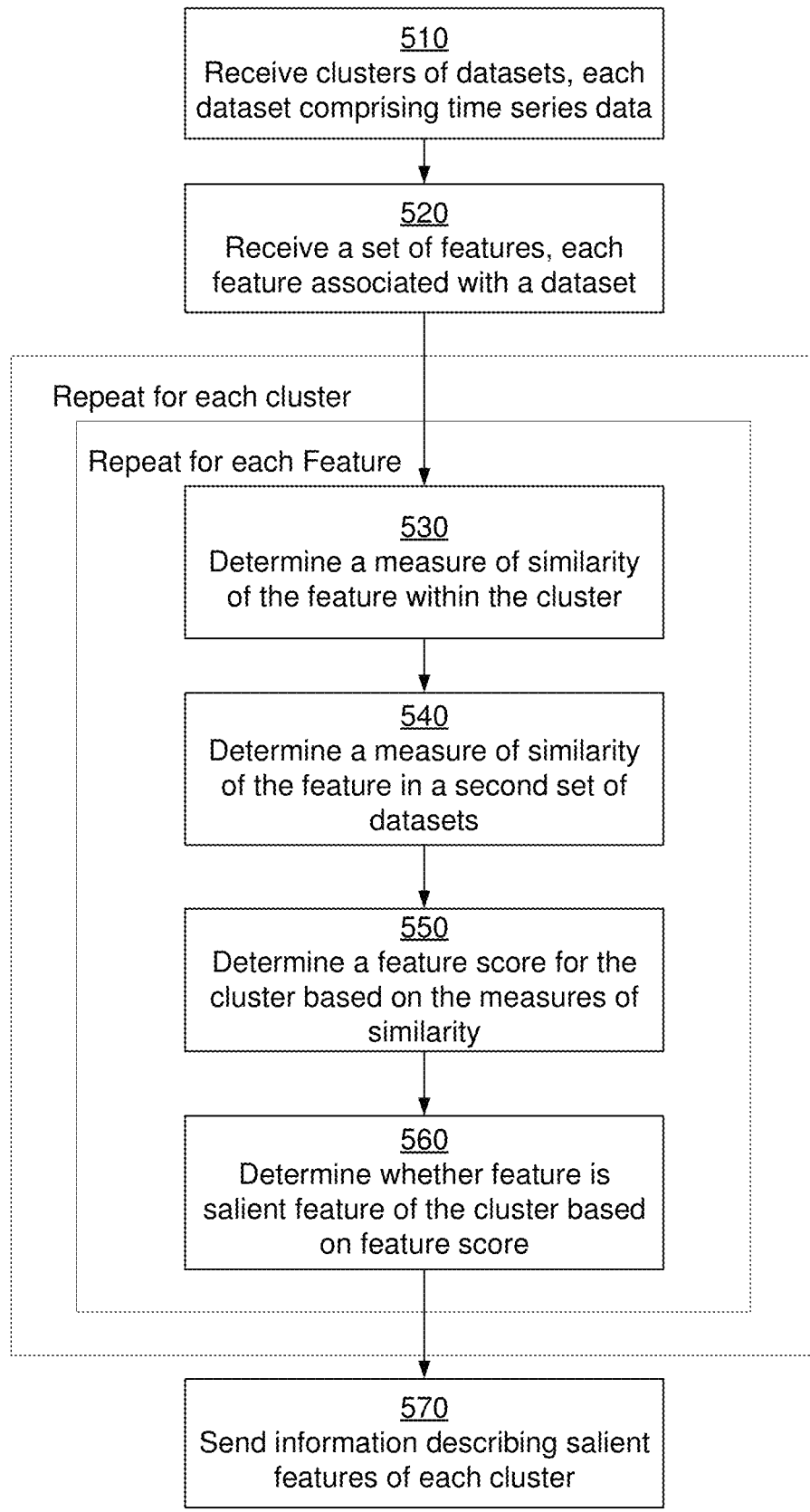
FIG. 5 illustrates a process of identifying salient features of clusters, according to an embodiment of the invention.

The data analysis system 150 may provide the generated clusters for further analysis to the feature analysis module 340. The feature analysis module 340 analyzes the clusters to identify salient features of clusters as illustrated in FIG. 5 and described as follows. The data analysis system 150 may send 460 information describing the clusters to a client device, for example, for presentation via a user interface.

In an embodiment, the data analysis system 150 uses salient features of the clusters to make predictions associated with an entity associated with a sequence of data. For example, the data analysis system 150 may receive information describing a particular entity E1 and map the entity E1 to a particular cluster C1. In an embodiment, the data analysis system 150 determines the feature vector F1 corresponding to the particular entity by providing sequence data associated with the particular entity E1 as input to the neural network 200 and extracting embeddings associated with the entity E1. The data analysis system 150 maps the feature vector F1 of the entity E1 to a cluster C1 by determining the closest cluster to the feature vector. The data analysis system 150 may use the salient features of the cluster C1 to make predictions associated with the entity E1. The data analysis system 150 may make the prediction by providing the salient features as input to a machine learning based model configured to predict a likelihood of certain action or event associated with the entity occurring within a threshold time interval. The machine learning based model may take features other than the salient features as input.

For example, the entities may represents users of an online system and the sequence data may represent user interaction data, for example, web clickstream associated with the users. The data analysis system 150 may use the salient features of the cluster C1 to predict based on the salient features of cluster C1, whether the user is likely to perform certain action, for example, whether the user is likely to click on a content item presented to the user, whether the user is likely to attend an event, or whether the user is likely to complete certain type of transaction, for example, a purchase.

As another example, the entities may represent sensors providing sequences of sensor data captured by each sensor. The data analysis system 150 may use the salient features of the cluster C1 to predict based on the salient features of cluster C1, whether certain event associated with a sensor is likely to happen, for example, a failure of an equipment monitored by the sensor, whether certain value associated with the sensor is likely to reach certain threshold level.

FIG. 5 illustrates a process of identifying salient features of clusters, according to an embodiment of the invention. The steps illustrated in the process may be performed in an order different from that indicated in FIG. 4. Furthermore, the steps may be executed by modules different from those indicated herein. The process described in FIG. 4 is applicable to any type of data set, for example, sequence data comprising an ordered list of data values or time series data.

The feature analysis module 340 receives clusters of data sets, for example, clusters determined by the process illustrated in FIG. 4. The feature analysis module 340 also receives a set of features describing the data sets or the entities associated with each data set. These received features are referred to as explanative features and are used for inferring explanations of clusters of sequences of data. In an embodiment, the features are received via a user interface presented to a user, for example, and expert. Alternatively, the data analysis system 150 may receive the features from another system or module that determines the features.

The feature analysis module 340 repeats the steps 530, 540, 550, and 560 for each cluster and for each feature. The feature analysis module 340 determines 530 a measure S1 of similarity of a feature within each cluster. In an embodiment, the feature analysis module 340 determines a measure of similarity of a feature within a cluster by identifying pairs of data sets that occur within the cluster and determining a distance between the feature values for the pair of data sets. If the determined distance value is within a threshold value, the feature analysis module 340 determines that the feature value is similar for the pair of data sets. The feature analysis module 340 repeats the comparison for more than a threshold number of pairs within the cluster or for more than a threshold fraction of possible pairs within the cluster. The feature analysis module 340 determines a measure of similarity by aggregating the similarity of the feature value for various pairs of data sets within the cluster.

The feature analysis module 340 determines 540 a measure S2 of similarity of a feature within a second set of data sets. In an embodiment, the second set of data sets represents the entire population of data sets from which clusters were obtained by the data analysis system 150. In another embodiment, the second set of data sets represents a sample of the entire population of data sets from which clusters were obtained by the data analysis system 150. The feature analysis module 340 compares feature values of pairs of data sets obtained from the second set of data sets. The feature analysis module 340 obtains a measure of similarity of the feature values by aggregating the similarity measure across a plurality of pairs, for example, all possible pairs of data sets of the second set of data sets, or more than a threshold number of possible pairs of data sets of the second set of data sets, or more than a threshold fraction of pairs of data sets of the second set of data sets.

The feature analysis module 340 determines 550 a feature score for the cluster for the selected feature based on the measures of similarity S1 and S2 determined. In an embodiment, the feature analysis module 340 determines a feature score for the cluster based on a ratio of S1 and S2, i.e., S1/S2. In other embodiments the feature analysis module 340 determines the feature score as another function of S1 and S2 that provides a measure of comparison of two values. The feature score has a high value if the feature has a higher likelihood of matching across data sets within the cluster as compared to the likelihood of matching across a second set of data sets, for example, a sample of the entire population of data sets.

The feature analysis module 340 determines 560 whether the feature is a salient feature of the cluster based on the feature score of the feature for the cluster. In an embodiment, the feature analysis module 340 determines that the feature is a salient feature of the cluster if the feature score of the feature for the cluster is above a threshold value. Accordingly, the feature analysis module 340 determines that the feature is a salient feature of the cluster if the feature score of the feature for the cluster indicates more than a threshold level of similarity of the feature across data sets of the cluster as compared to the similarity of the feature across a second set of data sets.

The feature analysis module 340 sends 570 information describing the salient features to the requestor. In an embodiment, the request for clusters may be received from a client device and the information describing the salient features is sent to the client device for presentation via a user interface.

In an embodiment, the received features are represented as a sequence of values. The length of a sequence representing a feature associated with a first data set may be different from a length of sequence representing a feature associated with a second data set.

The received features themselves may be represented as time series and may be referred to as time-variant features. Accordingly, the feature may comprise data values that change over time. For example, if the data sets represent user interactions, a feature may represent value of products searched by a user. Different types of user interaction include a user performing a search, a user purchasing a product, a user making a call to the customer service, user returning a product or item, and so on. Accordingly, over time the value of the products searched may change as the user performs searches. A feature may represent price of items that a user interacts with over time. For example, a user may interact with items with higher prices during holidays as compared to items that the user interacts with during other days of the year.

The feature may represent a rate of user interactions over time. Accordingly, the rate of user interactions may change over time. A particular cluster of users may have a specific type of user interaction pattern as compared to other clusters of users. For example, if the user interaction represents calls made by users to customer service, a cluster of users may make calls predominantly in evenings whereas another cluster of users may make calls during day time. The rate of user interactions may represent a number of user interactions in a unit time.

In one embodiment, the data analysis system determines that a first feature value comprising a first sequence matches with a second feature value comprising a second sequence if the first sequence can be obtained by performing a particular transformation on the second sequence, for example, by shifting the second sequence or by scaling the second sequence. The process of transforming (shifting and/or scaling) a sequence to be able to compare it with another sequence is referred to as dynamic time warping (DTW).

In some embodiments, the received features (explanative features) are cross-sectional features applicable to all groups of sequences or at least a plurality of sequences. The data analysis system determines for each group of sequence data) an aggregate value (e.g., average or standard deviation) of the cross-sectional feature for the group of sequence. For example, the data analysis system may determine an average value of the cross-sectional feature for each group and present that as a salient feature for the group. For example, if each sequence comprises transaction performed by a user, the cross-sectional feature may be a percentage of transactions performed by the user with a particular vendor. Another example of a cross-sectional feature is an average value of transactions for the user or total transactional value. The explanative features may be provided by a data scientist or determined automatically based on data mining techniques. Other examples of cross-sectional features include demographics of users associated with each sequence, for example, age of users, ethnicity of the users, financial status of the user, gender of users, location of users, and so on. Accordingly, a cluster C1 may be determined to have higher average age compared to another cluster C2. Similarly, cluster C1 may be determined to have higher average value of transactions compared to cluster C2. Cluster C1 may be determined to have higher percentage of users of particular gender or ethnicity compared to cluster C2.

Accordingly, the data analysis system compares a first feature value comprising a first sequence with a second feature value comprising a second sequence by shifting one of the sequences and matching the shifted sequence with the other sequence. The data analysis system determines that the first feature value matches the second feature value if the first sequence can be obtained by shifting the second sequence.

In another embodiment, the data analysis system compares a first feature value comprising a first sequence with a second feature value comprising a second sequence by determining that the first feature value matches the second feature value if the first sequence can be obtained by scaling the second sequence.

In another embodiment, wherein the data analysis system compares a first feature value comprising a first sequence with a second feature value comprising a second sequence by determining that the first feature value matches the second feature value if a shape of the first sequence is determined to be similar to a shape of the second sequence.

The feature analysis module 340 may determine a distinct set of salient features for each cluster. For example, a first cluster may have a first set of salient features and a second cluster may have a second set of salient features.

User Interface

Figure 6:
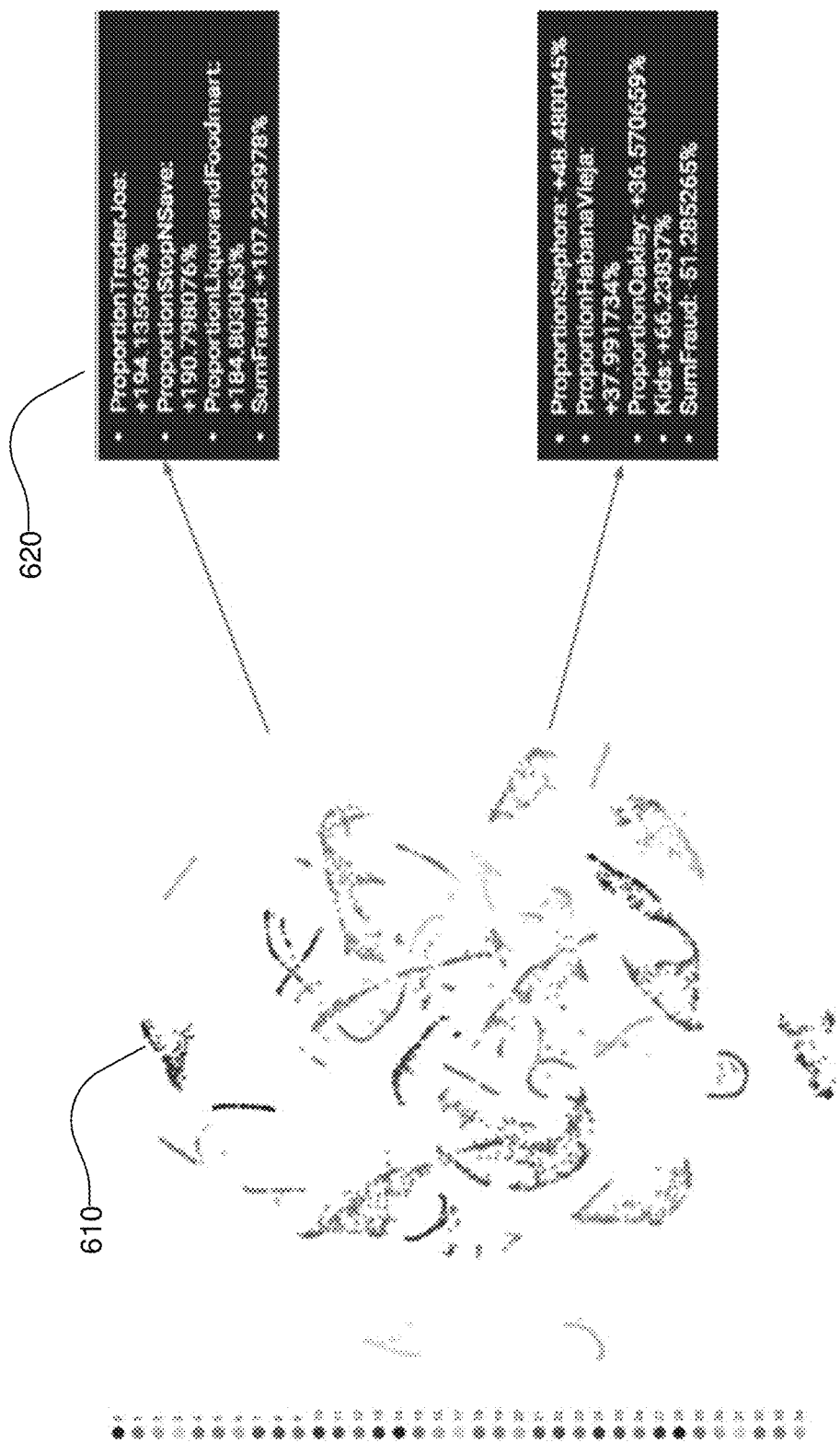
FIG. 6 illustrates a user interface for presenting information describing clusters of data sets according to an embodiment of the invention.

FIG. 6 illustrates a user interface for presenting information describing clusters of data sets according to an embodiment of the invention. The user interface may be presented by a client application, for example, a browser executing on a client device. The user interface maps the data sets to a small set of dimensions, for example, two or three dimensions. Each dimension is represented as an axis of a graph. The data sets are plotted as data points on the graph representation. The dimensions used for plotting the graphs are selected as features from the feature vector representation of the data sets obtained as embeddings of a recurrent neural network. As a result, a cluster 610 of data sets is represented as data points that are close to each other on the user interface. Since the dimensions corresponds to features obtained from the neural network, they may represent features that are not intuitive. Each cluster may be presented as data points having a particular color or a particular shape to distinguish data points of different clusters.

In an embodiment, a user can select a cluster to inspect salient features 620 of the cluster. Accordingly, the embodiments of the invention provide a mechanism to visualize data sets such as time series data. The user interface allows users to visualize large amount of sequence data, for example, time series data collected from a large number of sensors or sequence data representing user interactions collected from a large number of users.

Computer Architecture

Figure 7:
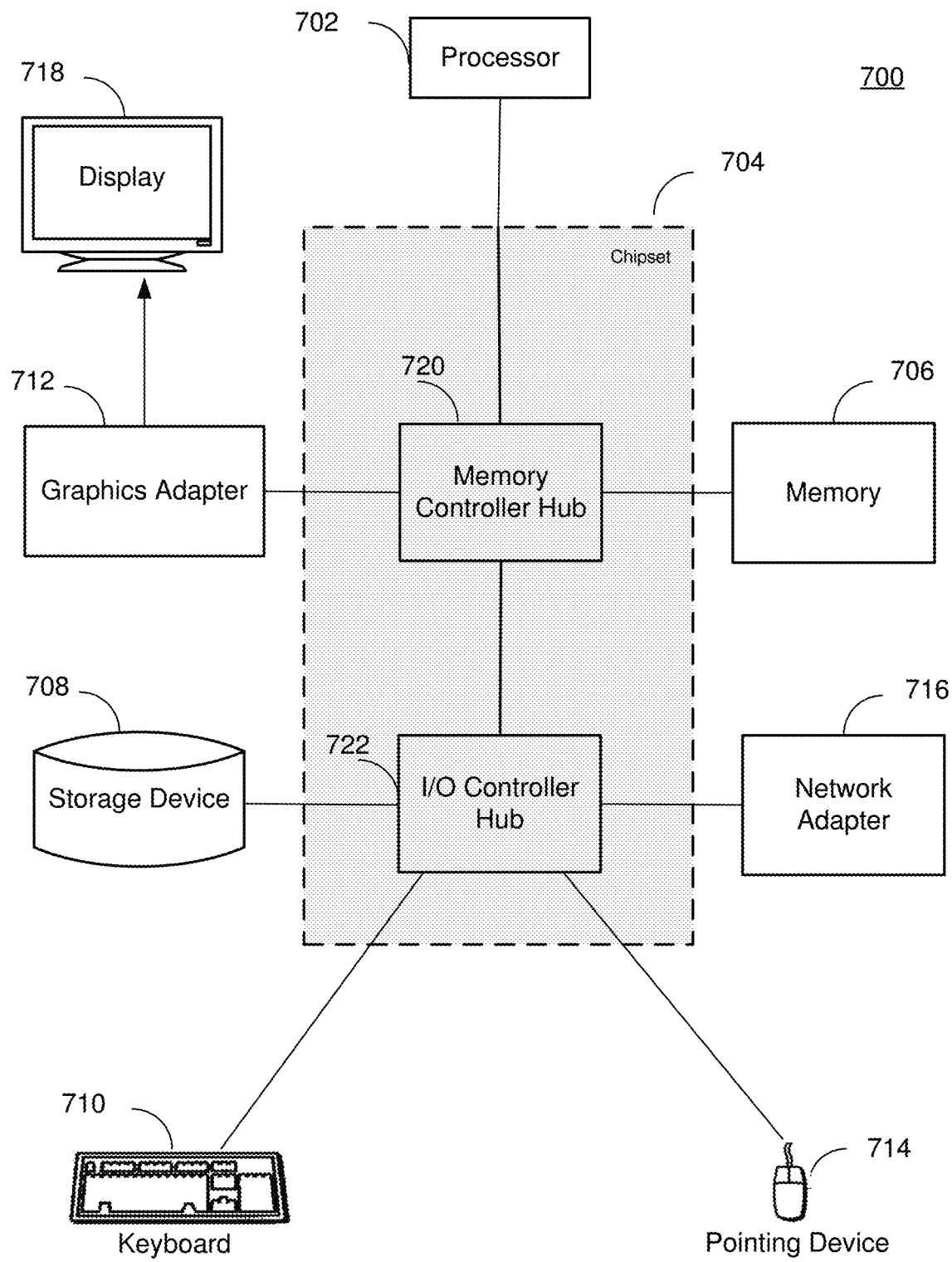
FIG. 7 is a high-level block diagram illustrating an example of a computer system in accordance with an embodiment.

FIG. 7 is a high-level block diagram illustrating an example system, in accordance with an embodiment. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702. The types of computers 700 used can vary depending upon the embodiment and requirements. For example, a computer may lack displays, keyboards, and/or other devices shown in FIG. 7.

Additional Considerations

The disclosed embodiments increase the efficiency of storage of time series data and also the efficiency of computation of the time series data. The neural network helps convert arbitrary size sequences of data into fixed size feature vectors. In particular the input sequence data (or time series data) can be significantly larger than the feature vector representation generated by the hidden layer of neural network. For example, an input time series may comprise several thousand elements whereas the feature vector representation of the sequence data may comprise a few hundred elements. Accordingly, large sequences of data are converted into fixed size and significantly small feature vectors. This provides for efficient storage representation of the sequence data. The storage representation may be for secondary storage, for example, efficient storage on disk or for or used for in-memory processing. For example, for processing the sequence data, a system with a given memory can process a large number of feature vector representations of sequences (as compared to the raw sequence data). Since large number of sequences can be loaded at the same time in memory, the processing of the sequences is more efficient since data does not have to be written to secondary storage often.

Furthermore, the process of clustering sequences of data is significantly more efficient when performed based on the feature vector representation of the sequences as compared to processing of the sequence data itself. This is so because the number of elements in the sequence data can be significantly higher than the number of elements in the feature vector representation of a sequence. Accordingly, a comparison of raw data of two sequences requires significantly more computations than comparison of two feature vector representations. Furthermore, since each sequence can be of different size, comparison of data of two sequences would require additional processing to extract individual features.

Embodiments can performs processing of the neural network in parallel, for example using a parallel/distributed architecture. For example, computation of each node of the neural network can be performed in parallel followed by a step of communication of data between nodes. Parallel processing of the neural networks provides additional efficiency of computation of the overall process described herein, for example, in FIG. 4.

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   receiving a plurality of sequences of data, wherein each sequence of data from the plurality of sequences represents a time series having a distinct length;
   for each of the plurality of sequences of data:
      providing the sequence of data as input to a recurrent neural network, the recurrent neural network comprising an input layer, one or more hidden layers of nodes, and an output layer, the one or more hidden layers prior to the output layer; and
      extracting a feature vector from a hidden layer of the recurrent neural network, the hidden layer prior to the output layer, wherein the feature vector is generated by the hidden layer responsive to providing the sequence data as input to the recurrent neural network;
   clustering the extracted feature vectors generated from the hidden layer prior to the output layer of the recurrent neural network, each extracted feature vector corresponding to one of the sequences of data, the clustering generating a plurality of clusters of feature vectors;
   for each cluster, determining one or more salient features characterizing the cluster; and
   sending information describing the clusters to a client device for presentation via a user interface.

2. The computer-implemented method of claim 1, wherein each sequence data represents time series data obtained from a sensor.

3. The computer-implemented method of claim 1, wherein each sequence data represents data describing user interactions with an online system.

4. The computer-implemented method of claim 1, wherein the recurrent neural network is an autoencoder configured to receive an input sequence and generate an output sequence matching the input sequence.

5. The computer-implemented method of claim 1, wherein determining one or more salient features characterizing the cluster:
   receiving a set of explanative features; and
   for each feature from the set of features, determining a feature score based on a comparison of a measure of similarity of the feature of a group of sequence of data associated with the cluster with a measure of similarity of the feature of a second group of sequences of data; and
   identifying one or more explanative features from the set of explanative features as salient features.

6. The computer-implemented method of claim 5, wherein an explanative feature is applicable to a plurality of clusters, wherein the information describing a particular cluster comprises an aggregate value of the feature for the cluster.

7. The computer-implemented method of claim 5, wherein a feature is identified as a salient feature of a group of sequences of data if the measure of similarity of the feature within the group of sequences of data is determined to be higher than the measure of similarity of the feature in the second group of sequences of data by a threshold value.

8. The computer-implemented method of claim 5, wherein comparing a first feature value comprising a first sequence with a second feature value comprising a second sequence determines that the first feature value matches the second feature value if the first sequence can be obtained by shifting the second sequence.

9. The computer-implemented method of claim 5, wherein comparing a first feature value comprising a first sequence with a second feature value comprising a second sequence determines that the first feature value matches the second feature value if the first sequence can be obtained by scaling the second sequence.

10. The computer-implemented method of claim 5, wherein comparing a first feature value comprising a first sequence with a second feature value comprising a second sequence determines that the first feature value matches the second feature value if a shape of the first sequence is determined to be similar to a shape of the second sequence.

11. A computer-implemented system, comprising:
    a computer processor; and
    a computer readable non-transitory storage medium storing instructions thereon, the instructions when executed by the computer processor cause the computer processor to perform the steps comprising:
       receiving a plurality of sequences of data, wherein each sequence of data from the plurality of sequences represents a time series having a distinct length;
       for each of the plurality of sequences of data:
          providing the sequence of data as input to a recurrent neural network, the recurrent neural network comprising an input layer, one or more hidden layers of nodes, and an output layer, the one or more hidden layers prior to the output layer; and extracting a feature vector from a hidden layer of the recurrent neural network, the hidden layer prior to the output layer, wherein the feature vector is generated by the hidden layer responsive to providing the sequence data as input to the recurrent neural network;

clustering the extracted feature vectors generated from the hidden layer prior to the output layer of the recurrent neural network, each extracted feature vector corresponding to one of the sequences of data, the clustering generating a plurality of clusters of feature vectors;

for each cluster, determining one or more salient features characterizing the cluster; and sending information describing the clusters to a client device for presentation via a user interface.

12. A computer-implemented method comprising:

receiving a plurality of sequences of data, wherein each sequence of data corresponds to sensor data generated by a sensor, and wherein each sequence of data represents a time series having a distinct length;

determining a plurality of groups of the sequences of data, determining the plurality of groups of sequences of data comprises:

providing the sequences of data as inputs to a recurrent neural network, the recurrent neural network comprising an input layer, one or more hidden layers of nodes, and an output layer, the one or more hidden layers prior to the output layer;

extracting feature vectors from a hidden layer of the recurrent neural network, the hidden layer prior to the output layer; and clustering the extracted feature vectors generated from the hidden layer prior to the output layer of the recurrent neural network, each extracted feature vector corresponding to one of the sequences of data, the clustering generating the plurality of groups of the sequences of data;

for each group of sequences of data, determining one or more salient features characterizing the group of sequences of data, the determining comprising:

receiving a set of explanative features;

for each explanative feature from the set of explanative features, determining a feature score based on a comparison of a measure of similarity of the explanative feature within the group of sequences of data with a measure of similarity of the explanative feature in a second group of sequences of data; and identifying one or more explanative features from the set of features as salient features based on the feature scores;

receiving information identifying a particular sensor;

determining a particular group of sequence of data corresponding to the particular sensor; and predicting an event associated with the particular sensor based on the salient features characterizing the particular group of sequences of data.

13. The computer-implemented method of claim 12, wherein the recurrent neural network is an autoencoder configured to receive an input sequence of data and generate an output sequence of data matching the input sequence.

14. The computer-implemented method of claim 12, wherein predicting an event associated with the particular sensor is performed using a machine learning based model configured to output a likelihood of the event occurring within a threshold time interval.

15. The computer-implemented method of claim 12, wherein the predicted event associated with the sensor represents a failure of an equipment associated with the sensor.

16. The computer-implemented method of claim 12, wherein the second group of sequences of data is determined by taking a sample of sequences of data from the plurality of sequences of data.

17. The computer-implemented method of claim 12, wherein a feature is identified as a salient feature of a cluster if the measure of similarity of the feature within a group of sequences of data corresponding to the cluster is determined to be higher than the measure of similarity of the feature in the second group of sequences of data by a threshold value.

18. The computer-implemented method of claim 12, wherein a feature comprises a sequence of values, and wherein comparing a first feature value comprising a first sequence with a second feature value comprising a second sequence determines that the first feature value matches the second feature value if the first sequence can be obtained by performing a transformation of the second sequence, wherein the transformation comprises one or more of: shifting of a sequence or scaling of a sequence.

* * * * *